(12) United States Patent
Tautz et al.

(10) Patent No.: US 8,301,276 B2
(45) Date of Patent: Oct. 30, 2012

(54) CONTROL DEVICE FOR THE POSITION CONTROL OF A HYDRAULIC CYLINDER UNIT COMPRISING A LINEARIZATION UNIT

(75) Inventors: Wilfried Tautz, Forchheim (DE); Dietrich Wohld, Rauschenberg (DE)

(73) Assignee: Siemens Aktiengesellschaft, Munich (DE)

( * ) Notice: Subject to any disclaimer, the term of this patent is extended or adjusted under 35 U.S.C. 154(b) by 188 days.

(21) Appl. No.: 12/740,722

(22) PCT Filed: Sep. 5, 2008

(86) PCT No.: PCT/EP2008/061804
§ 371 (c)(1),
(2), (4) Date: Apr. 30, 2010

(87) PCT Pub. No.: WO2009/056378
PCT Pub. Date: May 7, 2009

(65) Prior Publication Data
US 2010/0294125 A1   Nov. 25, 2010

(30) Foreign Application Priority Data

Oct. 30, 2007 (DE) .................. 10 2007 051 857

(51) Int. Cl.
| | |
|---|---|
| G05B 11/32 | (2006.01) |
| G05B 19/40 | (2006.01) |
| G05D 7/00 | (2006.01) |
| G05D 11/00 | (2006.01) |
| F15B 15/26 | (2006.01) |
| F15B 9/02 | (2006.01) |
| F15B 13/16 | (2006.01) |
| F16D 31/02 | (2006.01) |

(52) U.S. Cl. ............ 700/68; 700/70; 700/282; 318/685; 318/687; 91/42; 91/357; 91/361; 91/365; 60/468

(58) Field of Classification Search .............. 700/67–70, 700/275, 282; 318/560, 671, 685, 687; 91/41, 91/42, 357, 358 R, 361, 363 R, 365; 60/325, 60/459, 468
See application file for complete search history.

(56) References Cited

U.S. PATENT DOCUMENTS 4,339,984 A * 7/1982 Huhne .............................. 91/42
(Continued)

FOREIGN PATENT DOCUMENTS

DE           2111608           9/1972
(Continued)

OTHER PUBLICATIONS

German Office Action for Application No. 10 2007 051 857.0 (3 pages), Jul. 28, 2008.
(Continued)

Primary Examiner — Crystal J Barnes-Bullock
(74) Attorney, Agent, or Firm — King & Spalding L.L.P.

(57) ABSTRACT

A control device for the position control of a hydraulic cylinder unit has a controller which receives a set and an actual piston position and determines a preliminary manipulated variable based on the difference of the set and actual positions. A linearization unit multiplies the variable with a linearization factor and outputs it to the valve control unit so that the piston is adjusted at an adjustment speed. The linearization unit determines the factor dynamically as a function of the actual piston position and of working pressures that prevail at both piston sides. The linearization factor is determined such that a ratio of the adjustment speed to the difference of the set and actual positions is independent of the actual position and the working pressures. In the specific case where the controller is configured as a P controller, the order of the controller and the linearization unit can be reversed.

18 Claims, 3 Drawing Sheets

U.S. PATENT DOCUMENTS

| | | | | |
|---|---|---|---|---|
| 4,794,314 A * | 12/1988 | Janu et al. | | 318/685 |
| 5,004,264 A * | 4/1991 | Kozaki et al. | | 280/5.51 |
| 5,353,217 A | 10/1994 | Berghs et al. | | 364/149 |
| 5,829,336 A * | 11/1998 | Schulze | | 91/365 |
| 6,138,810 A * | 10/2000 | Fujii et al. | | 192/85.01 |
| 6,705,199 B2 * | 3/2004 | Liao et al. | | 91/363 R |
| 6,767,311 B2 * | 7/2004 | Yoshikawa et al. | | 477/176 |
| 6,901,315 B2 * | 5/2005 | Kockemann | | 700/282 |
| 6,988,363 B2 * | 1/2006 | Bitter | | 60/468 |
| 7,062,832 B2 * | 6/2006 | Yo et al. | | 29/407.08 |
| 7,258,058 B2 | 8/2007 | Smith et al. | | 91/454 |
| 7,299,112 B2 * | 11/2007 | LaPlante et al. | | 700/282 |
| 2007/0245794 A1 | 10/2007 | Brandenfels et al. | | 72/247 |
| 2008/0163750 A1 * | 7/2008 | Yuan et al. | | 91/402 |
| 2008/0243274 A1 | 10/2008 | Keintzel et al. | | 700/69 |
| 2010/0005844 A1 | 1/2010 | Felkl et al. | | 72/7.2 |

FOREIGN PATENT DOCUMENTS

| | | |
|---|---|---|
| DE | 102005042168 | 12/2006 |
| DE | 102007003243 | 7/2008 |
| EP | 0557541 | 9/1993 |
| EP | 570935 A1 * | 11/1993 |
| JP | 63223336 A * | 9/1988 |
| RU | 2072544 C1 | 1/1997 |
| WO | 2007020126 | 2/2007 |
| WO | 2007/027304 A2 | 3/2007 |

OTHER PUBLICATIONS

International Search Report and Written Opinion for Application No. PCT/EP2008/061804 (11 pages), Jul. 7, 2009.

* cited by examiner

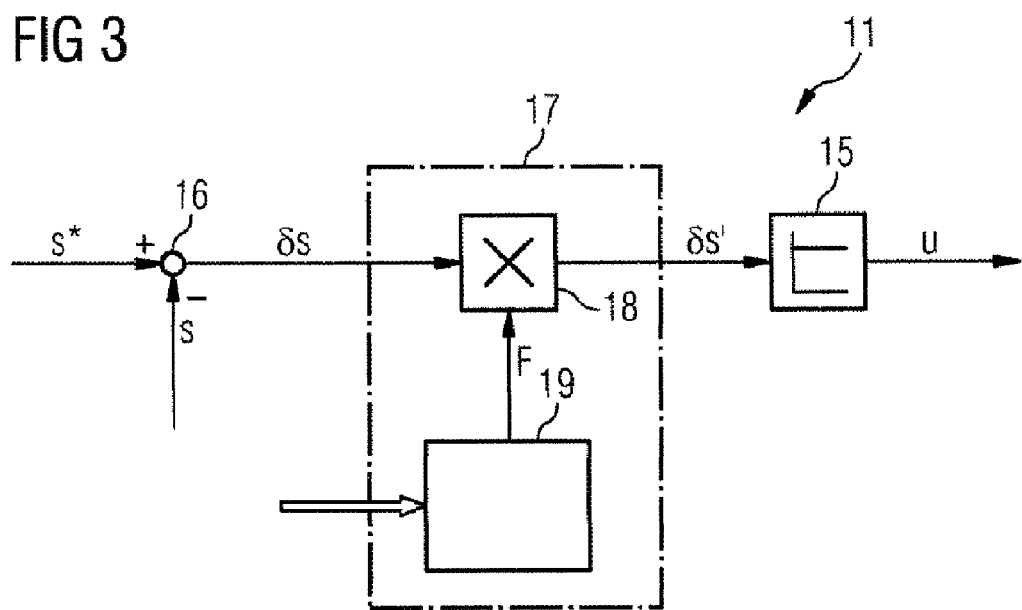
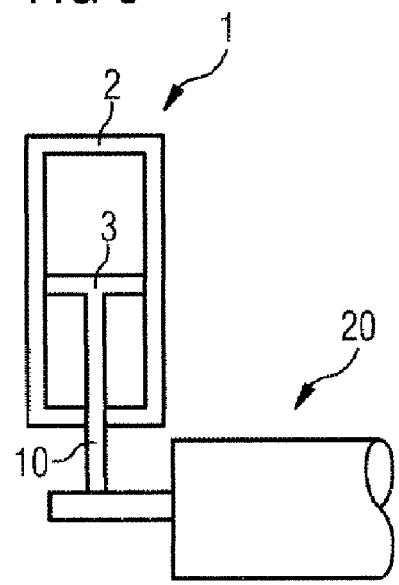

CONTROL DEVICE FOR THE POSITION CONTROL OF A HYDRAULIC CYLINDER UNIT COMPRISING A LINEARIZATION UNIT

CROSS-REFERENCE TO RELATED APPLICATIONS

This application is a U.S. National Stage Application of International Application No. PCT/EP2008/061804 filed Sep. 5, 2008, which designates the United States of America, and claims priority to German Application No. 10 2007 051 857.0 filed Oct. 30, 2007, the contents of which are hereby incorporated by reference in their entirety.

TECHNICAL FIELD

The present invention is based on a control device for the position control of a hydraulic cylinder unit, wherein the control device has a controller which receives, on the input side, a setpoint position of a piston of the hydraulic cylinder unit and an actual position of the piston, determines a manipulated variable for a valve control unit of the hydraulic cylinder unit on the basis of the difference between the setpoint position and the actual position, and outputs the determined manipulated variable to the valve control unit, so that the piston is adjusted at an adjustment speed.

BACKGROUND

Hydraulic cylinder units exhibit a control behavior which is heavily dependent on the operating point of the hydraulic cylinder unit. A position controller which has been optimized for a specific operating point operates less well or poorly at other operating points.

In order to improve the control behavior, it is known in the prior art to provide what is referred to as a butterfly curve as a control characteristic of the controller. The butterfly curve does not, however, cover the entire space of possible operating points and therefore does not operate in an optimum way in every operating state.

Furthermore, for position controllers for hydraulic cylinder units it is known to perform a respective non-linear transformation for the setpoint position and for the actual position independently of one another and additionally to perform partial linearization of the position controller. This procedure is very costly.

SUMMARY

According to various embodiments, possible ways of being able to achieve an optimum control behavior in the simplest possible way can be provided.

According to an embodiment, a control device for the position control of a hydraulic cylinder unit, may comprise a controller which receives, on the input side, a setpoint position of a piston of the hydraulic cylinder unit and an actual position of the piston and determines a preliminary manipulated variable for a valve control unit of the hydraulic cylinder unit on the basis of the difference between the setpoint position and the actual position, wherein a linearization unit is arranged downstream of the controller and multiplies the preliminary manipulated variable by a linearization factor and outputs the preliminary manipulated variable multiplied by the linearization factor, as the final manipulated variable to the valve control unit, so that the piston is adjusted at an adjustment speed, wherein the linearization unit determines the linearization factor dynamically as a function of the actual position of the piston, and of working pressures which prevail on both sides of the piston and on the inflow side and outflow side of the valve control unit, and wherein the linearization unit determines the linearization factor in such a way that a ratio between the adjustment speed and the difference between the setpoint position and actual position is independent of the actual position of the piston and of the working pressures.

According to a further embodiment, the controller can be embodied as a P controller.

According to another embodiment, a control device for the position control of a hydraulic cylinder unit may comprise a controller which is embodied as a P controller and receives, on the input side, a control variable, determines a manipulated variable for a valve control unit of the hydraulic cylinder unit on the basis of the control variable, and outputs the manipulated variable to the valve control unit, so that the piston is adjusted at an adjustment speed, wherein a linearization unit is arranged upstream of the controller and receives a setpoint position of a piston of the hydraulic cylinder unit and an actual position of the piston, multiplies the difference between said positions by a linearization factor, and outputs the difference, multiplied by the linearization factor, as a control variable to the controller, wherein the linearization unit determines the linearization factor dynamically as a function of the actual position of the piston, and of working pressures prevailing on both sides of the piston and on the inflow side and outflow side of the valve control unit, and wherein the linearization unit determines the linearization factor in such a way that a ratio of the adjustment speed with respect to the difference between the setpoint position and actual position of the piston is independent of the actual position of the piston and of the working pressures.

According to a further embodiment of one of the control devices as described above, the linearization unit may use, for the determination of the linearization factor, power data of the valve unit as further data, working faces which are effective on both sides of the piston and minimum possible effective volumes on both sides of the piston. According to a further embodiment of one of the control devices as described above, the linearization unit may receive the further data at least partially as parameters. According to a further embodiment of one of the control devices as described above, the linearization unit may determine the linearization factor according to the relationship:

$$F = K \cdot \frac{\frac{AKA}{hA} + \frac{AKB}{hB}}{\sqrt{\frac{pP - pA}{pN}} \cdot \frac{QNA}{hA} + \sqrt{\frac{pB - pT}{pN}} \cdot \frac{QNB}{hB}}$$

wherein
 F is the linearization factor,
 K is a freely selectable, constant scaling factor,
 AKA is the working face of the piston facing the increasing working volume,
 AKB is the working face of the piston facing the decreasing working volume,
 pA is the working pressure acting on the working face of the piston facing the increasing working volume,
 pB is the working pressure acting on the working face of the piston facing the decreasing working volume,
 PP is the working pressure present on the inflow side of the valve control unit, pT is the working pressure present on the outflow side of the valve control unit, pN is a nominal pressure of the valve control unit, QNA is a rated volume flow which flows into the increasing working volume when a difference between the working pressure present on the inflow side of the valve control unit and the working pressure present in the increasing working volume is equal to the nominal pressure, QNB is a rated volume flow which flows out of the decreasing working volume when a difference between the working pressure present in the decreasing working volume and the working pressure present on the outflow side of the valve control unit is equal to the nominal pressure, hA is the quotient between the increasing working volume and the working face facing this working volume, wherein the increasing working volume is determined on the basis of the actual position of the piston and the minimum possible effective volume for this side of the piston, and hB is the quotient between the decreasing working volume and the working face facing the decreasing working volume, wherein the decreasing working volume is determined on the basis of the actual position of the piston and the minimum possible effective volume for this side of the piston.

According to a further embodiment of one of the control devices as described above, the control device may be embodied as a control device which can be programmed by means of software and is programmed with a software module so that it is embodied as claimed in one of the above claims on the basis of the programming with the software module.

According to yet another embodiment, a software module may comprise machine code whose processing by means of a control device which can be programmed by means of software and is connected to a hydraulic cylinder unit causes the control device to be embodied as described above.

According to yet another embodiment, a data carrier may store a software module as described above in a machine-readable form.

According to yet another embodiment, a hydraulic cylinder unit controlled by means of a control device as described above may be used for controlling the positioning of a rolling stand.

BRIEF DESCRIPTION OF THE DRAWINGS

Further advantages and details emerge from the following description of exemplary embodiments in conjunction with the drawings, in which, in a basic illustration:

FIG. 3 shows a second embodiment of the control device, FIG. 5 shows a positioning device for a roller of a rolling stand.

DETAILED DESCRIPTION

Figure 1:
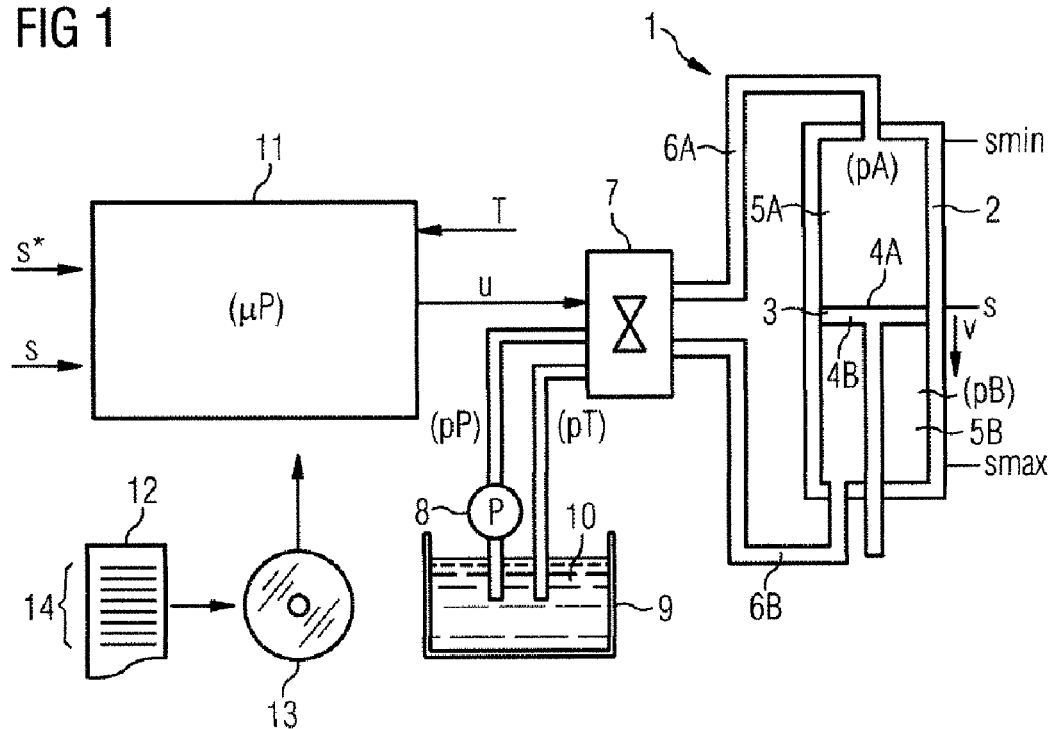
FIG. 1 shows a block circuit diagram of a control device and of a hydraulic cylinder unit.

According to various embodiments, the controller determines a preliminary manipulated variable. Furthermore, a linearization unit, which multiplies the preliminary manipulated variable by a linearization factor and outputs the preliminary manipulated variable, multiplied by the linearization factor, as a final manipulated variable to the valve control unit, is arranged downstream of the controller. The linearization unit determines the linearization factor dynamically as a function of the actual position of the piston and of working pressures prevailing on both sides of the piston and on the inflow side and outflow side of the valve control unit. The linearization unit determines the linearization factor in such a way that a ratio of the adjustment speed with respect to the difference between the setpoint position and the actual position is independent of the actual position of the piston and of the working bridges. In this context, the controller is preferably embodied as a P controller.

In the specific case in which the controller is embodied as a P controller, the sequence of controller and linearization unit can be interchanged. In this case, the linearization unit multiplies the difference between the setpoint position and actual position by the linearization factor and feeds the multiplied difference to the controller as its input variable.

However, the method with which the linearization factor is determined remains unchanged.

As a rule, the linearization unit uses, for the determination of the linearization factor, power data of the valve unit as further data, working faces which are effective on both sides of the piston and minimum possible effective volumes on both sides of the piston. The further data in this context may be permanently predefined for the linearization unit. However, the linearization unit preferably receives the further data at least partially as parameters.

The linearization unit preferably determines the linearization factor according to the relationship:

$$F = K \cdot \frac{\frac{AKA}{hA} + \frac{AKB}{hB}}{\sqrt{\frac{pP-pA}{pN}} \cdot \frac{QNA}{hA} + \sqrt{\frac{pB-pT}{pN}} \cdot \frac{QNB}{hB}}$$

The variables used in the above equation have the following meaning here:

F is the linearization factor,

K is a freely selectable, constant scaling factor,

AKA is the working face of the piston facing the increasing working volume,

AKB is the working face of the piston facing the decreasing working volume, pA is the working pressure acting on the working face of the piston facing the increasing working volume, pB is the working pressure acting on the working face of the piston facing the decreasing working volume, PP is the working pressure present on the inflow side of the valve control unit, pT is the working pressure present on the outflow side of the valve control unit, pN is a nominal pressure of the valve control unit, QNA is a rated volume flow which flows into the increasing working volume when a difference between the working pressure present on the inflow side of the valve control unit and the working pressure present in the increasing working volume is equal to the nominal pressure, QNB is a rated volume flow which flows out of the decreasing working volume when a difference between the working pressure present in the decreasing working volume and the working pressure present on the outflow side of the valve control unit is equal to the nominal pressure, hA is the quotient between the increasing working volume and the working face facing this working volume, wherein the increasing working volume is determined on the basis of the actual position of the piston and the minimum possible effective volume for this side of the piston, and hB is the quotient between the decreasing working volume and the working face facing the decreasing working volume, wherein the decreasing working volume is determined on the basis of the actual position of the piston and the minimum possible effective volume for this side of the piston.

The control device can be embodied as a hardware structure. However, it is preferably embodied as a control device which can be programmed by means of software and is programmed with a software module, so that it is embodied according to various embodiments on the basis of the programming with the software module.

The software module comprises machine code whose processing by means of a control device which can be programmed by means of software and is connected to a hydraulic cylinder unit causes the control device to be embodied as described above. The software module can be stored in machine-readable form on a data carrier.

In principle, the control device according to various embodiments can be used universally. However, it is preferably used for controlling the positioning of a rolling stand.

According to FIG. 1, a hydraulic cylinder unit 1 has a hydraulic cylinder 2 in which a piston 3 is movably mounted. The piston 3 can be moved within the hydraulic cylinder 1 between a minimum position smin and a maximum position smax. At any time, it is therefore at an actual position s, which lies between the minimum position smin and the maximum position smax.

The piston 3 has a first working face 4A and a second working face 4B. Each working face 4A, 4B faces a corresponding working volume 5A, 5B.

The working volumes 5A, 5B are connected hydraulically to a hydraulic pump 8 and a hydraulic reservoir 9 via hydraulic paths 6A, 6B and a valve control unit 7. The hydraulic paths 6A, 6B extend here from the respective working volume 5A, 5B to the valve control unit 7.

When the piston 3 is in its minimum position smin, a specific volume of a hydraulic fluid 10 is present in the hydraulic path 6A. This volume is the minimum quantity of hydraulic fluid 10 which is located between the valve control unit 7 and the working face 4A of the piston 3.

This quantity of hydraulic fluid 10 is the minimum possible effective volume for the working volume 5A. It is denoted below by the reference symbol VminA.

In an analogous fashion, a specific quantity of hydraulic fluid 10 is located in the hydraulic path 6B when the piston 3 is in its maximum position smax. The quantity of hydraulic fluid 10 constitutes a minimum possible effective volume for the working volume 5B. This minimum volume is denoted below by the reference symbol VminB.

When the piston 3 is located at any actual position s, the working volume 5A has a volume value VA which is obtained as $$VA = VminA + AKA(s-smin)$$

The reference symbol AKA denotes here the surface area value of the working face 4A, facing the working volume 5A, of the piston 3.

It is possible to divide the effective volume VA by the surface area value AKA. The quotient $$hA = VA/AKA$$

corresponds to an effective height of a column of the hydraulic fluid 10 above the piston 3.

In an analogous fashion, corresponding values VB and hB for the second working face 4B or the second working volume 5B can be determined on the basis of the minimum possible effective volume VminB, the surface area value AKB of the working face 4B facing the working volume 5B, the actual position s and the maximum position smax according to the relationships $$VB = VminB + AKB(smax-s)$$

and $$hB = VB/AKB.$$

A first working pressure pA prevails in the first working volume 5A, and a second working pressure pB prevails in the second working volume 5B. A pump pressure pP is applied to the hydraulic fluid 10 via the hydraulic pump 8. A reservoir pressure pT prevails in the hydraulic reservoir 9. The pump pressure pP and the reservoir pressure pT correspond to a working pressure prevailing on the inflow side and a working pressure prevailing on the outflow side of the valve control unit 7.

The valve control unit 7 is embodied in the present case as a four-way valve. By means of a four-way valve it is possible to apply the pump pressure pP or the reservoir pressure pT alternatively to each of the two working volumes 5A, 5B. However, the valve control unit 7 could alternatively also be embodied as a two-way valve. In this case, a constant pressure, for example half the pump pressure pP, would be applied to one of the two working volumes 5A, 5B. The pump pressure pP or the reservoir pressure pT can alternatively be applied to the other of working volumes 5A, 5B in this case.

The valve control unit 7, and with it the entire hydraulic cylinder unit 1, is controlled by means of a control device 11. The piston 3 is position-controlled here. The control device 11 is preferably embodied according to FIG. 1 as control device 11 which can be programmed by means of software. The control device 11 is therefore programmed by means of a software module 12. The software module 12 can be fed to the control device 11, for example by means of a data carrier 13 on which the software module 12 is stored in machine-readable form. In principle, any data carrier is possible here as the data carrier 13. A CD-ROM 13 is illustrated (purely by way of example) in FIG. 1.

The software module 12 comprises a machine code 14 which can be processed by the control device 11. The processing of the machine code 14 by the control device 11 has the effect that the control device 11 controls the hydraulic cylinder unit 1 in the way explained in more detail below. The programming of the control device 11 with the software module 12 brings about the corresponding embodiment of the control device 11.

According to FIG. 1, a setpoint position s* of the piston 3 and the actual position s of the piston 3 are firstly fed to the control device 11. The control device 11 subsequently determines, in a way which is still to be explained, a manipulated variable u for the valve control unit 7, and outputs the manipulated variable u to the valve control unit 7. As a result, the control device 11 carries out the position control of the hydraulic cylinder unit 1 (to be more precise that of the piston 3).

Figure 2:
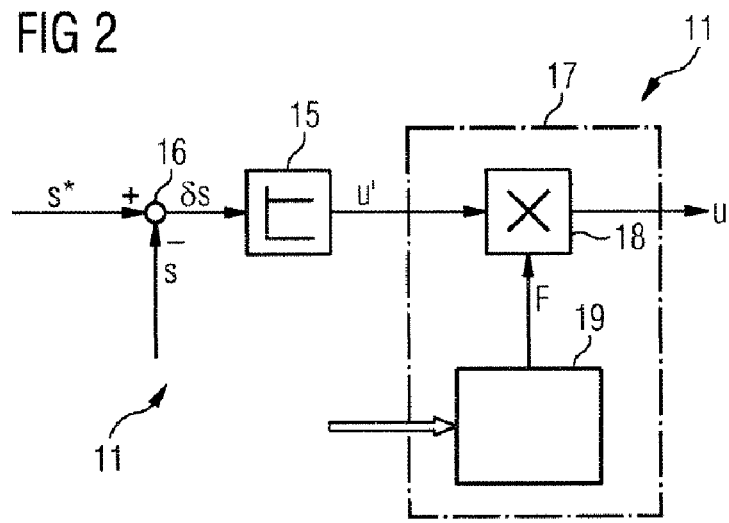
FIG. 2 shows a first embodiment of the control device.

The control device 11 is preferably embodied according to FIG. 2. According to FIG. 2, the control device 11 has a controller 15 which receives, on the input side, the setpoint position s* and the actual position s. At a node 16, the difference δs is formed between the setpoint position s* and the actual position s. This difference is denoted below as the control difference δs.

The control difference δs is fed to the controller 15 which determines a preliminary manipulated variable u' for the valve control unit 7 on the basis of the control difference δs. According to FIG. 2, the controller 15 is preferably embodied here as a P controller.

A linearization unit 17 is arranged downstream of the controller. The linearization unit 17 has here a multiplier 18 and a determining device 19. The determining device 19 determines, in a way which is still to be explained, a linearization factor F and outputs the linearization factor F to the multiplier 18. The multiplier 18 also receives the preliminary manipulated variable u' from the controller 15 and multiplies the preliminary manipulated variable u' by the linearization factor F. The linearization unit 17 determines in this way the final manipulated variable u, which is output to the valve control unit 7.

The valve control unit 7 sets itself in accordance with the manipulated variable u which is transmitted to it. This causes the piston 3 to be displaced or adjusted at an adjustment speed v.

In the embodiment according to FIG. 2, the controller 15 can, in principle, be any controller. However, an embodiment of the controller 15 as a P controller is generally sufficient and also preferred.

As an alternative to the embodiment according to FIG. 2, it is possible according to FIG. 3 to interchange the sequence of the controller 15 and the linearization unit 17. In this case, the controller 15 must be embodied as a P controller. Moreover, the method of operation of the embodiment according to FIG. 3 is completely analogous to the embodiment according to FIG. 2. It is therefore possible to dispense with detailed explanations about FIG. 3.

The determining device 19 of the linearization unit 17 determines the linearization factor F dynamically as a function of the actual position s of the piston 3, the working pressures pA, pB prevailing on both sides of the piston 3 and the working pressures pP, pT prevailing on the inflow side and outflow side of the valve control unit 7. The determining device 19 determines the linearization factor F here in such a way that a ratio of the adjustment speed v with respect to the difference δs between the setpoint position s* and actual position s is independent of the actual position s and the working pressures pA, pB, pP, pT.

Figure 4:
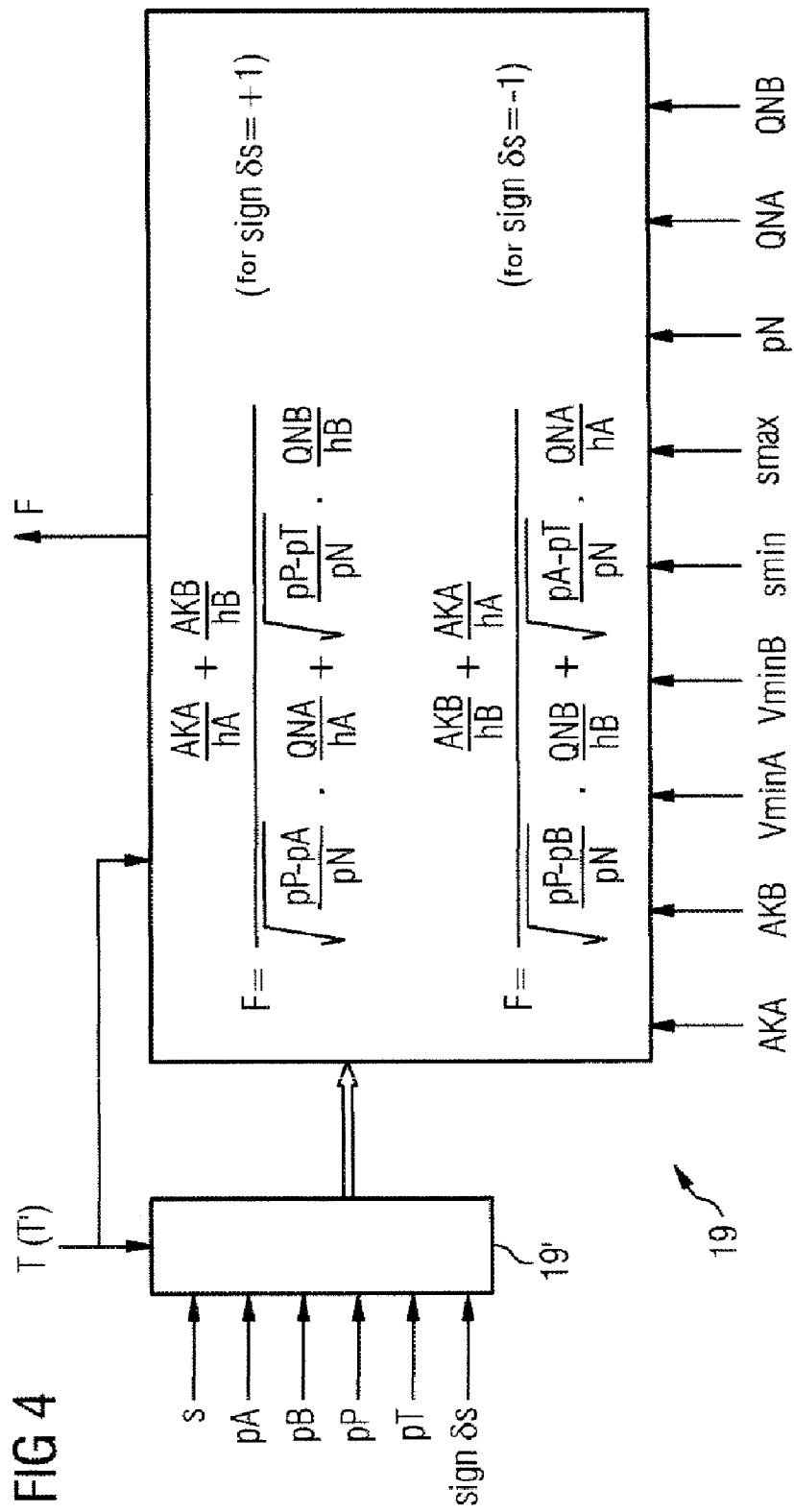
FIG. 4 shows a determining device of a linearization unit.

The method of operation of the determining device 19 will be explained below in more detail in conjunction with FIG. 4.

The control device 11 is usually clocked with a working clock T. The control device 11 receives in each case a new setpoint position s* and a new actual position s with the frequency of the working clock T, determines the manipulated variable u and outputs the manipulated variable u to the valve control unit 7.

A new value for the actual position s and the working pressures pA, pB is respectively fed to the determining device 19, likewise with the working clock T, and exceptionally also with a relatively small auxiliary clock T' (that is to say a clock T' which has a lower frequency than the working clock T). Furthermore, the sign of the control difference δs is fed to the determining device 19. The clocked feeding of these variables s, pA, pB, δs is indicated here in FIG. 4 by a latch 19', which is clocked with the working clock T (or the auxiliary clock T') and is arranged upstream of the determining device 19.

The pump pressure pP and the reservoir pressure pT are generally constant. It is therefore possible to feed these two pressures pP, pT to the determining device 19 once (i.e. in advance and therefore as a parameter). However, it is likewise alternatively possible to feed the inflow-side working pressure pB and the outflow-side working pressure pT to the determining device 19 in a clocked fashion, and therefore as a variable.

As a rule, the determining device 19 requires further data for the precise calculation of the linearization factor F. The further data generally comprise power data pN, QNA, QNB of the valve control unit 7, the working faces AKA, AKB which are effective on both sides of the piston 3, and the minimum possible effective volumes VminA, VminB on both sides of the piston. These values can be permanently predefined to the determining device 19, for example by means of the software module 12. Alternatively, the further data can be predefined, at least partially, to the determining device 19 after the programming of the control device 11 (i.e. within the scope of the activation of the control device 11) as parameters which are retained unchanged during the operation of the control device 11.

The linearization factor F is dependent on the direction of movement of the piston 3, that is to say on the direction in which the piston 3 is to be displaced. The linearization factor F is therefore dependent on the sign of the control difference δs. It is assumed below that the piston 3 is to be displaced in the positive direction, that is to say in the direction of the maximum position smax. In this case, the determining device 19 preferably determines the linearization factor F as $$F = K \cdot \frac{\frac{AKA}{hA} + \frac{AKB}{hB}}{\sqrt{\frac{pP - pA}{pN} \cdot \frac{QNA}{hA}} + \sqrt{\frac{pB - pT}{pN} \cdot \frac{QNB}{hB}}}$$

The variables which are used in the formula above are, with the exception of the power data pN, QNA, QNB of the valve control unit 7—already defined. The power data pN, QNA and QNB of the valve control unit 7 have the following meaning:

pN is a (principally any) nominal pressure. It corresponds to a reference pressure to which the variables QNA, QNB are standardized.

QNA is a rated volume flow which flows into the working volume 5A when a difference between the pump pressure pP and the working pressure pA prevailing in the working volume 5A is equal to the nominal pressure pN.

QNB is a rated volume flow which flows out of the working volume 5B when a difference between the working pressure pB and the reservoir pressure pT is equal to the nominal pressure pN.

As already mentioned, the linearization factor F is direction-dependent. If the piston 3 is to be displaced in the opposite direction, the linearization factor F is obtained as $$F = K \cdot \frac{\frac{AKA}{hA} + \frac{AKB}{hB}}{\sqrt{\frac{pP - pA}{pN} \cdot \frac{QNA}{hA}} + \sqrt{\frac{pB - pT}{pN} \cdot \frac{QNB}{hB}}}$$

Nevertheless, claim 6 only specifies—correctly—a single formula since claim 6 is formulated in a direction-dependent fashion. In contrast, the determining device 19 preferably calculates both values and selects the correct linearization factor F on the basis of the sign of the control difference δs.

The arrangement according to various embodiments composed of the hydraulic cylinder unit 1 and the control device 11 can in principle be used in any way. However, according to FIG. 5 it is preferably used to control the positioning of a rolling stand 20 which is indicated schematically in FIG. 5.

The various embodiments have a large number of advantages. In particular optimum operation of the control device 11 occurs at any operating point of the hydraulic cylinder unit 1. The control is completely linearized. Transformations (cf. non-linear HGC) are not necessary. Furthermore, likewise in contrast to the non-linear HGC, integration of the various embodiments into already existing control systems is easily possible since superimposed control structures which are already present (interlinked controls and the like) do not have to be changed. This results in simplified activation and maintenance of the control device 11 according to various embodiments.

The above description serves only to explain the present invention. On the other hand, the scope of protection of the present invention will be determined exclusively by the appended claims.

What is claimed is:

1. A control device for the position control of a hydraulic cylinder unit, comprising
a controller which receives, on the input side, a setpoint position of a piston of the hydraulic cylinder unit and an actual position of the piston and determines a preliminary manipulated variable for a valve control unit of the hydraulic cylinder unit on the basis of the difference between the setpoint position and the actual position,
wherein a linearization unit is arranged downstream of the controller and multiplies the preliminary manipulated variable by a linearization factor and outputs the preliminary manipulated variable multiplied by the linearization factor, as the final manipulated variable to the valve control unit, so that the piston is adjusted at an adjustment speed,
wherein the linearization unit determines the linearization factor dynamically as a function of the actual position of the piston, and of working pressures which prevail on both sides of the piston and on the inflow side and outflow side of the valve control unit, and
wherein the linearization unit determines the linearization factor in such a way that a ratio between the adjustment speed and the difference between the setpoint position and actual position is independent of the actual position of the piston and of the working pressures.

2. The control device according to claim 1, wherein the controller is embodied as a P controller.

3. The control device according to claim 1, wherein the linearization unit uses, for the determination of the linearization factor, power data of the valve unit as further data, working faces which are effective on both sides of the piston and minimum possible effective volumes on both sides of the piston.

4. The control device according to claim 3, wherein the linearization unit receives the further data at least partially as parameters.

5. The control device according to claim 3, wherein the linearization unit determines the linearization factor according to the relationship:

$$F = K \cdot \frac{\frac{AKA}{hA} + \frac{AKB}{hB}}{\sqrt{\frac{pP - pA}{pN}} \cdot \frac{QNA}{hA} + \sqrt{\frac{pB - pT}{pN}} \cdot \frac{QNB}{hB}}$$

wherein
F is the linearization factor,
K is a freely selectable, constant scaling factor,
AKA is the working face of the piston facing the increasing working volume,
AKB is the working face of the piston facing the decreasing working volume,
pA is the working pressure acting on the working face of the piston facing the increasing working volume,
pB is the working pressure acting on the working face of the piston facing the decreasing working volume,
pP is the working pressure present on the inflow side of the valve control unit,
pT is the working pressure present on the outflow side of the valve control unit,
pN is a nominal pressure of the valve control unit,
QNA is a rated volume flow which flows into the increasing working volume when a difference between the working pressure present on the inflow side of the valve control unit and the working pressure present in the increasing working volume is equal to the nominal pressure,
QNB is a rated volume flow which flows out of the decreasing working volume when a difference between the working pressure present in the decreasing working volume and the working pressure present on the outflow side of the valve control unit is equal to the nominal pressure,
hA is the quotient between the increasing working volume and the working face facing this working volume, wherein the increasing working volume is determined on the basis of the actual position of the piston and the minimum possible effective volume for this side of the piston, and
hB is the quotient between the decreasing working volume and the working face facing the decreasing working volume, wherein the decreasing working volume is determined on the basis of the actual position of the piston and the minimum possible effective volume for this side of the piston.

6. The control device according to claim 1, wherein the control device is embodied as a control device programmed by a software module.

7. A control device for the position control of a hydraulic cylinder unit, comprising
a controller which is embodied as a P controller and receives, on the input side, a control variable, determines a manipulated variable for a valve control unit of the hydraulic cylinder unit on the basis of the control variable, and outputs the manipulated variable to the valve control unit, so that the piston is adjusted at an adjustment speed,
wherein a linearization unit is arranged upstream of the controller and receives a setpoint position of a piston of the hydraulic cylinder unit and an actual position of the piston, multiplies the difference between said positions by a linearization factor, and outputs the difference, multiplied by the linearization factor, as a control variable to the controller, wherein the linearization unit determines the linearization factor dynamically as a function of the actual position of the piston, and of working pressures prevailing on both sides of the piston and on the inflow side and outflow side of the valve control unit, and wherein the linearization unit determines the linearization factor in such a way that a ratio of the adjustment speed with respect to the difference between the setpoint position and actual position of the piston is independent of the actual position of the piston and of the working pressures.

8. The control device according to claim 7, wherein the linearization unit uses, for the determination of the linearization factor, power data of the valve unit as further data, working faces which are effective on both sides of the piston and minimum possible effective volumes on both sides of the piston.

9. The control device according to claim 8, wherein the linearization unit receives the further data at least partially as parameters.

10. The control device according to claim 8, wherein the linearization unit determines the linearization factor according to the relationship:

$$F = K \cdot \frac{\frac{AKA}{hA} + \frac{AKB}{hB}}{\sqrt{\frac{pP-pA}{pN}} \cdot \frac{QNA}{hA} + \sqrt{\frac{pB-pT}{pN}} \cdot \frac{QNB}{hB}}$$

wherein
F is the linearization factor,
K is a freely selectable, constant scaling factor,
AKA is the working face of the piston facing the increasing working volume,
AKB is the working face of the piston facing the decreasing working volume,
pA is the working pressure acting on the working face of the piston facing the increasing working volume,
pB is the working pressure acting on the working face of the piston facing the decreasing working volume,
pP is the working pressure present on the inflow side of the valve control unit,
pT is the working pressure present on the outflow side of the valve control unit,
pN is a nominal pressure of the valve control unit,
QNA is a rated volume flow which flows into the increasing working volume when a difference between the working pressure present on the inflow side of the valve control unit and the working pressure present in the increasing working volume is equal to the nominal pressure,
QNB is a rated volume flow which flows out of the decreasing working volume when a difference between the working pressure present in the decreasing working volume and the working pressure present on the outflow side of the valve control unit is equal to the nominal pressure,
hA is the quotient between the increasing working volume and the working face facing this working volume, wherein the increasing working volume is determined on the basis of the actual position of the piston and the minimum possible effective volume for this side of the piston, and
hB is the quotient between the decreasing working volume and the working face facing the decreasing working volume, wherein the decreasing working volume is determined on the basis of the actual position of the piston and the minimum possible effective volume for this side of the piston.

11. The control device according to claim 7, wherein the control device is embodied as a control device programmed by a software module.

12. A method comprising the step of using a hydraulic cylinder unit and controlling the hydraulic cylinder unit by means of a control device for controlling the positioning of a rolling stand, wherein the control device comprises:
a controller which receives, on the input side, a setpoint position of a piston of the hydraulic cylinder unit and an actual position of the piston and determines a preliminary manipulated variable for a valve control unit of the hydraulic cylinder unit on the basis of the difference between the setpoint position and the actual position,
wherein a linearization unit is arranged downstream of the controller and multiplies the preliminary manipulated variable by a linearization factor and outputs the preliminary manipulated variable multiplied by the linearization factor, as the final manipulated variable to the valve control unit, so that the piston is adjusted at an adjustment speed,
wherein the linearization unit determines the linearization factor dynamically as a function of the actual position of the piston, and of working pressures which prevail on both sides of the piston and on the inflow side and outflow side of the valve control unit, and
wherein the linearization unit determines the linearization factor in such a way that a ratio between the adjustment speed and the difference between the setpoint position and actual position is independent of the actual position of the piston and of the working pressures.

13. The method according to claim 12, wherein the linearization unit uses, for the determination of the linearization factor, power data of the valve unit as further data, working faces which are effective on both sides of the piston and minimum possible effective volumes on both sides of the piston.

14. A method comprising the step of using a hydraulic cylinder unit and controlling the hydraulic cylinder unit by means of a control device for controlling the positioning of a rolling stand, wherein the control device comprises:
a controller which is embodied as a P controller and receives, on the input side, a control variable, determines a manipulated variable for a valve control unit of the hydraulic cylinder unit on the basis of the control variable, and outputs the manipulated variable to the valve control unit, so that the piston is adjusted at an adjustment speed,
wherein a linearization unit is arranged upstream of the controller and receives a setpoint position of a piston of the hydraulic cylinder unit and an actual position of the piston, multiplies the difference between said positions by a linearization factor, and outputs the difference, multiplied by the linearization factor, as a control variable to the controller,
wherein the linearization unit determines the linearization factor dynamically as a function of the actual position of the piston, and of working pressures prevailing on both sides of the piston and on the inflow side and outflow side of the valve control unit, and
wherein the linearization unit determines the linearization factor in such a way that a ratio of the adjustment speed with respect to the difference between the setpoint position and actual position of the piston is independent of the actual position of the piston and of the working pressures.

15. The method according to claim 14, wherein the linearization unit uses, for the determination of the linearization factor, power data of the valve unit as further data, working faces which are effective on both sides of the piston and minimum possible effective volumes on both sides of the piston.

16. The method according to claim 15, wherein the linearization unit receives the further data at least partially as parameters.

17. The method according to claim 15, wherein the linearization unit determines the linearization factor according to the relationship:

$$F = K \cdot \frac{\frac{AKA}{hA} + \frac{AKB}{hB}}{\sqrt{\frac{pP - pA}{pN} \cdot \frac{QNA}{hA}} + \sqrt{\frac{pB - pT}{pN} \cdot \frac{QNB}{hB}}}$$

wherein
F is the linearization factor,
K is a freely selectable, constant scaling factor,
AKA is the working face of the piston facing the increasing working volume,
AKB is the working face of the piston facing the decreasing working volume,
pA is the working pressure acting on the working face of the piston facing the increasing working volume,
pB is the working pressure acting on the working face of the piston facing the decreasing working volume,
pP is the working pressure present on the inflow side of the valve control unit,
pT is the working pressure present on the outflow side of the valve control unit,
pN is a nominal pressure of the valve control unit,
QNA is a rated volume flow which flows into the increasing working volume when a difference between the working pressure present on the inflow side of the valve control unit and the working pressure present in the increasing working volume is equal to the nominal pressure,
QNB is a rated volume flow which flows out of the decreasing working volume when a difference between the working pressure present in the decreasing working volume and the working pressure present on the outflow side of the valve control unit is equal to the nominal pressure,
hA is the quotient between the increasing working volume and the working face facing this working volume, wherein the increasing working volume is determined on the basis of the actual position of the piston and the minimum possible effective volume for this side of the piston, and
hB is the quotient between the decreasing working volume and the working face facing the decreasing working volume, wherein the decreasing working volume is determined on the basis of the actual position of the piston and the minimum possible effective volume for this side of the piston.

18. The method according to claim 14, wherein the control device is embodied as a control device programmed by a software module.

* * * * *